United States Patent
Kimura et al.

(10) Patent No.: US 9,120,084 B2
(45) Date of Patent: Sep. 1, 2015

(54) CATALYST DEVICE FOR EXHAUST GAS (71) Applicant: HONDA MOTOR CO., LTD., Tokyo (JP)

(72) Inventors: Toshiaki Kimura, Wako (JP); Hiroyuki Horimura, Wako (JP); Takeshi Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/147,649

(22) Filed: Jan. 6, 2014

(65) Prior Publication Data
US 2014/0242406 A1 Aug. 28, 2014

(30) Foreign Application Priority Data
Feb. 26, 2013 (JP) ................................. 2013-035699

(51) Int. Cl.
| | |
|---|---|
| B01J 23/00 | (2006.01) |
| B01J 23/02 | (2006.01) |
| B01J 23/08 | (2006.01) |
| B01J 23/40 | (2006.01) |
| B01J 23/42 | (2006.01) |
| B01J 23/44 | (2006.01) |
| B01J 23/56 | (2006.01) |
| B01J 20/00 | (2006.01) |
| B01J 21/04 | (2006.01) |
| B01J 23/63 | (2006.01) |
| B01J 37/02 | (2006.01) |
| B01J 21/06 | (2006.01) |
| B01J 35/04 | (2006.01) |
| B01D 53/94 | (2006.01) |
| F01N 3/28 | (2006.01) |

(52) U.S. Cl.
CPC ............... *B01J 23/63* (2013.01); *B01D 53/945* (2013.01); *B01J 21/066* (2013.01); *B01J 35/04* (2013.01); *B01J 37/0244* (2013.01); *F01N 3/281* (2013.01); *B01D 2255/1021* (2013.01); *B01D 2255/1023* (2013.01); *B01D 2255/1025* (2013.01); *B01D 2255/2092* (2013.01); *B01D 2255/20715* (2013.01); *B01D 2255/407* (2013.01); *B01D 2255/9025* (2013.01); *F01N 2510/02* (2013.01); *F01N 2510/0684* (2013.01); *Y10T 428/12333* (2015.01); *Y10T 428/24149* (2015.01)

(58) Field of Classification Search
USPC ......... 502/327, 332–334, 339, 349, 355, 415, 502/439, 527.12, 527.13, 527.19, 527.22, 502/300; 422/180
See application file for complete search history.

(56) References Cited

U.S. PATENT DOCUMENTS

| | | | | |
|---|---|---|---|---|
| 4,572,904 | A * | 2/1986 | Onal | 502/333 |
| 4,650,782 | A * | 3/1987 | Onal | 502/339 |
| 4,702,897 | A * | 10/1987 | Onal | 423/213.5 |
| 5,316,738 | A * | 5/1994 | Kojima et al. | 422/180 |
| 5,591,413 | A * | 1/1997 | Toyoda | 422/180 |
| 5,599,509 | A * | 2/1997 | Toyao et al. | 422/180 |
| 5,648,050 | A * | 7/1997 | Matsumoto et al. | 422/180 |

(Continued)

FOREIGN PATENT DOCUMENTS

JP 2012-011387 A 1/2012

*Primary Examiner* — Cam N. Nguyen
(74) *Attorney, Agent, or Firm* — Squire Patton Boggs (US) LLP (57) ABSTRACT

A heat-resistant protective layer having heat resistance than a catalyst layer and permeability which allows an exhaust gas to be supplied to the catalyst layer is formed on a surface of the catalyst layer.

6 Claims, 4 Drawing Sheets

(56) References Cited

U.S. PATENT DOCUMENTS

| | | | |
|---|---|---|---|
| 5,680,503 A * | 10/1997 | Abe et al. | 392/485 |
| 5,811,064 A * | 9/1998 | Kojima et al. | 422/180 |
| 6,660,401 B2 * | 12/2003 | Hsu | 428/593 |
| 7,030,059 B2 * | 4/2006 | Tanabe | 502/439 |
| 7,094,730 B2 * | 8/2006 | LaBarge et al. | 502/332 |
| 7,348,289 B2 * | 3/2008 | Ichikawa et al. | 502/174 |
| 8,057,746 B2 * | 11/2011 | Matsuoka | 422/171 |
| 2003/0223921 A1 * | 12/2003 | Hsu | 422/180 |
| 2008/0247919 A1 * | 10/2008 | Kurth et al. | 422/180 |

* cited by examiner

CATALYST DEVICE FOR EXHAUST GAS

BACKGROUND

1. Field

Embodiments of the present invention relate to a catalyst device for an exhaust gas where a catalyst layer is formed on a honeycomb carrier.

2. Description of Related Art

A catalyst device for cleaning an exhaust gas is mounted on a vehicle such as a motorcycle on which an internal combustion engine is mounted. The catalyst device is configured such that a catalyst which removes a harmful component is carried on a honeycomb carrier, and a material which conforms to the regulation of each country is suitably used as a catalyst component.

For example, in cleaning a harmful component such as hydrogen carbide (HC), carbon monoxide (CO) or a nitrogen oxide (NOx) in an exhaust gas, noble metal such as platinum (Pt), palladium (Pd), or rhodium (Rh) is used in general.

As this type of catalyst device, there has been proposed a catalyst device where an oxide particle coating layer typically made of alumina having a large specific surface area is formed on a honeycomb carrier, and a catalyst layer in which a catalyst component such as noble metal is dispersed is formed on the coating layer (for example, see Patent Literature 1 (JP-A-2012-11387)).

SUMMARY

It is often the case that an internal combustion engine which is required to have a relatively high output is, in general, in a state of rich air-fuel mixture (air-fuel mixture having a theoretical air-fuel ratio of less than 14.7), and a valve overlap which is in a state where both an intake port and an exhaust port simultaneously open is set large in general and hence, an amount of unburned gas in an exhaust gas is liable to be increased.

As a result of studies that the inventors of the invention have made, the inventors have found that an unburned gas or the like sticks to a catalyst in a use environment of an internal combustion engine of a high output, a temperature of an outermost surface becomes considerably high because of combustion heat, reaction heat or the like and, as a result, abnormal deterioration occurs as if the outermost surface is exposed to heat of 1000 degrees. This abnormal deterioration of the outermost surface lowers a cleaning performance of a catalyst and hence, a lifetime of the catalyst is lowered.

As a method of suppressing such abnormal deterioration, the use of a technique disclosed in Patent Literature 1 is considered. However, although the technique disclosed in Patent Literature 1 is a technique for preventing the thermal deterioration of the whole coating layer, a catalyst component is exposed on the outermost surface and hence, it is difficult to sufficiently suppress the thermal deterioration of the outermost surface.

The invention has been made in view of the above-mentioned circumstances, and it is an object of the invention to provide a catalyst device for an exhaust gas which can suppress the thermal deterioration of an outermost surface.

To solve the above-mentioned problems, embodiments of the invention provide a catalyst device for an exhaust gas where a catalyst layer is formed on a honeycomb carrier, wherein a heat-resistant protective layer having heat resistance and permeability which allows an exhaust gas to be supplied to the catalyst layer is formed on a surface of the catalyst layer.

Due to such a constitution, the thermal deterioration of an outermost surface of the catalyst device can be suppressed by the heat-resistant protective layer. Accordingly, the durability of the catalyst device is enhanced, and a use amount of noble metal in catalyst can be reduced correspondingly.

In certain embodiments, the catalyst layer may contain noble metal, and the heat-resistant protective layer may not contain noble metal. Due to such a constitution, the thermal deterioration of noble metal used in the catalyst can be suppressed, and a use amount of noble metal can be efficiently reduced so that the catalyst device can be obtained at a low cost.

In certain embodiments, the heat-resistant protective layer may be formed using a heat-resistant metal compound or a powder mixture of the heat-resistant metal compound. Due to such a constitution, the heat-resistant protective layer can be formed using a relatively inexpensive material.

In certain embodiments, permeability of the heat-resistant protective layer may be ensured by performing setting including setting of at least a particle size of a material which forms the heat-resistant protective layer. Due to such a constitution, the heat-resistant protective layer can easily ensure permeability without requiring the particular structure for ensuring permeability which allows an exhaust gas to be diffused into the catalyst layer. In this case, the heat-resistant protective layer may contain at least one of alumina and zirconia. Due to such a constitution, the heat-resistant protective layer can be formed using a relatively inexpensive material, and the heat-resistant protective layer can acquire an improved close contact property with a surface of the catalyst.

In certain embodiments, the heat-resistant protective layer may have a thickness of 1 µm to 1 µm. Due to such a constitution, it is possible to suppress the deterioration of the catalyst layer while preventing a thickness of the heat-resistant protective layer from becoming excessively large.

In certain embodiments, the honeycomb carrier may be a metal carrier where a cylindrical body which is formed in a plurality of layers by winding a metal flat sheet and a metal corrugated sheet in an overlapping manner is supported on a metal outer sleeve, and a length (L) of the honeycomb carrier may be set twice or more as large as a diameter D of the honeycomb carrier. In such a configuration, the deterioration of the catalyst caused by a high thermal load on an upstream side can be suppressed and hence, the honeycomb carrier can ensure a surface area and a strength thereof whereby the honeycomb carrier can easily decrease a diameter thereof and also can be easily miniaturized. Accordingly, the catalyst device can be easily arranged in an exhaust path of a small space.

In certain embodiments, the catalyst device may be a catalyst device used for a vehicle where an internal combustion engine is capable of being used in a region where an average value of an air-fuel ratio is 14.5 or less. The catalyst device of the invention can suppress the thermal deterioration of the outermost surface and hence, it is possible to enhance the durability of the catalyst and also reduce an amount of catalyst noble metal due to such an enhancement of durability in a vehicle where the internal combustion engine is capable of being used in a region where an average value of an air-fuel ratio is 14.5 or less.

In embodiments of the invention, the heat-resistant protective layer having heat resistance and permeability which allows an exhaust gas to be supplied to the catalyst layer is formed on the surface of the catalyst layer and hence, the thermal deterioration of the outermost surface can be suppressed.

By forming the catalyst layer and the heat-resistant protective layer such that the catalyst layer contains noble metal, and the heat-resistant protective layer does not contain noble metal, a use amount of noble metal can be efficiently reduced and hence, the catalyst device can be obtained at a low cost.

By forming the heat-resistant protective layer using a heat-resistant metal compound or a powder mixture containing the heat-resistant metal compound, the heat-resistant protective layer can be formed using a relatively inexpensive material.

By allowing permeability of the heat-resistant protective layer to be ensured by performing setting including setting of at least a particle size of a material which forms the heat-resistant protective layer, it is possible to easily ensure permeability which allows an exhaust gas to be diffused into the catalyst layer.

By allowing the heat-resistant protective layer to contain at least one of alumina and zirconia, the heat-resistant protective layer can be formed using a relatively inexpensive material, and the heat-resistant protective layer can acquire an improved close contact property with a surface of the catalyst.

By allowing the heat-resistant protective layer to have a thickness of 1 µm to 10 µm, it is possible to suppress the deterioration of the catalyst layer while preventing a thickness of the heat-resistant protective layer from becoming excessively large.

The honeycomb carrier is a metal carrier where a cylindrical body which is formed in a plurality of layers by winding a metal flat sheet and a metal corrugated sheet in an overlapping manner is supported on a metal outer sleeve, and a length L of the honeycomb carrier is set twice or more as large as a diameter D of the honeycomb carrier. In such a configuration, the deterioration of the catalyst caused by a high thermal load on an upstream side can be suppressed and hence, the honeycomb carrier can ensure a surface area and a strength thereof whereby the honeycomb carrier can easily decrease a diameter thereof and also can be easily miniaturized.

By using the catalyst device for a vehicle where an internal combustion engine is capable of being used in a region where an average value of an air-fuel ratio is 14.5 or less, it is possible to enhance the durability of the catalyst and also reduce an amount of noble metal in the catalyst due to such an enhancement of durability in such a saddle-ride-type vehicle.

DETAILED DESCRIPTION

The inventors have extensively studied the related art and, as the result of the study, have found that, in a motorcycle or the like which is a miniature high-power vehicle, an unburned gas in an exhaust gas sticks to an outermost surface of a catalyst, and abnormal deterioration occurs in the outermost surface because of combustion heat or reaction heat of the unburned gas.

Under such circumstances, the inventors have extensively studied this problem and, as the result of the study, have found that, the above-mentioned problems can be solved by forming a heat-resistant protective layer which has heat resistance and diffuses an exhaust gas to a catalyst layer on a surface of the catalyst layer.

A catalyst device according to the embodiment of the invention is explained.

Figure 1:
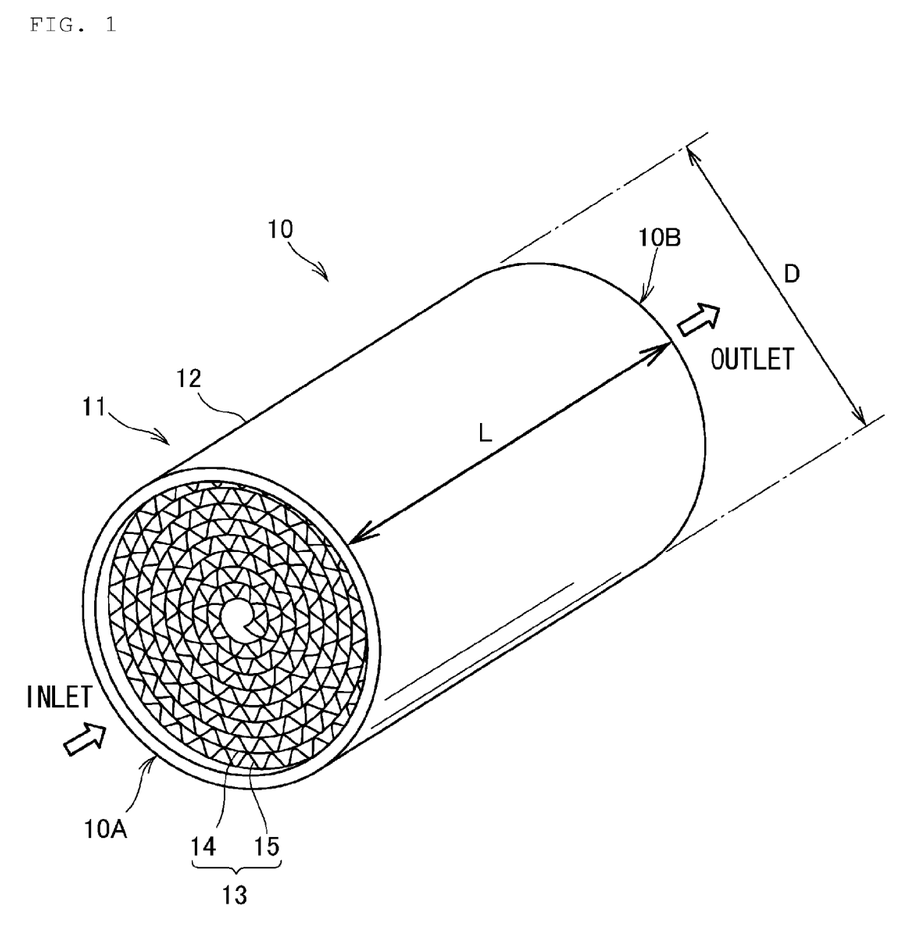
FIG. 1 is a perspective view of a catalyst device according to an embodiment of the invention.
Figure 2:
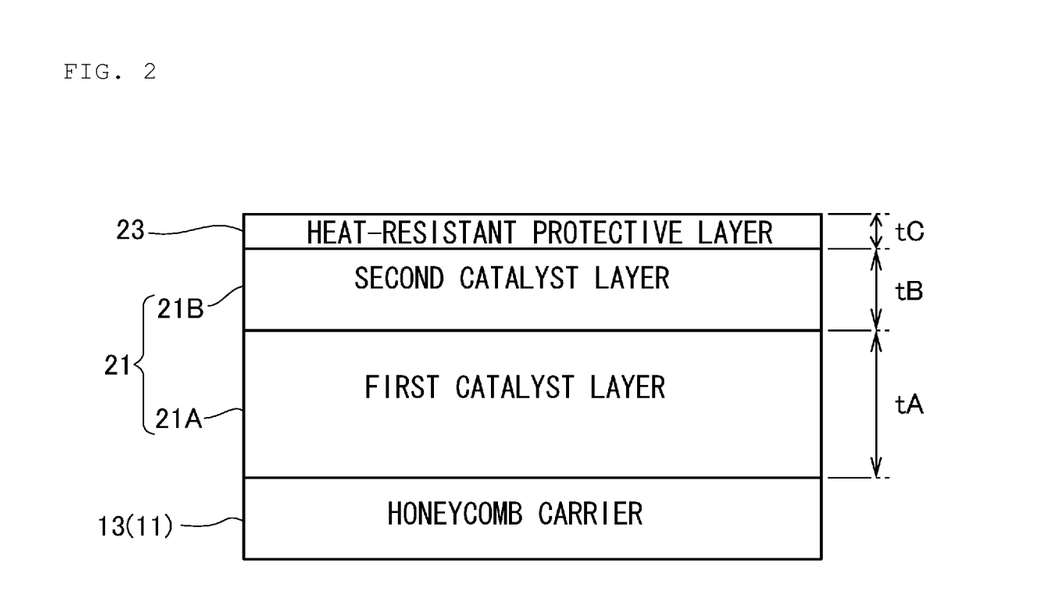
FIG. 2 is a view schematically showing the surface structure of the catalyst device.

FIG. 1 is a perspective view of the catalyst device, and FIG. 2 is a view schematically showing the surface structure of the catalyst device.

The catalyst device 10 is a catalyst device for an exhaust gas which is arranged in an exhaust path such as an exhaust pipe or an exhaust muffler of a motorcycle, and is provided for cleaning an exhaust gas.

As shown in FIG. 1, in the catalyst device 10, a catalyst is carried on a honeycomb carrier 11 which is a carrier for carrying the catalyst thereon. An exhaust gas which enters the catalyst device 10 from an inlet 10A is brought into contact with the catalyst while flowing toward an outlet 10B in the axial direction so that the exhaust gas is cleaned.

The honeycomb carrier 11 is formed such that a honeycomb cylindrical body 13 made of metal is press-fitted in and supported on a cylindrical casing 12 made of metal which has a circular cylindrical shape and constitutes a metal outer sleeve. The honeycomb carrier 11 is also referred to as a metal carrier or a honeycomb metal carrier.

To be more specific, the cylindrical casing 12 is made of stainless steel or other steel material, and is formed into a circular cylindrical shape in advance. Alternatively, the cylindrical casing 12 is formed by tightly wrapping a metal sheet on the honeycomb cylindrical body 13 in a cylindrical shape. The cylindrical casing 12 and the honeycomb cylindrical body 13 may be fixed to each other by welding or may be fixed to each other using various other known fixing methods.

The honeycomb cylindrical body 13 is formed such that a laminated sheet is formed by making a flat sheet (metal flat sheet) 14 made of metal and a corrugated sheet (metal corrugated sheet) 15 made of metal overlap with each other and, thereafter, the laminated sheet is formed in a plurality of layers by being wound in a roll shape. Due to such a constitution, the honeycomb cylindrical body has a honeycomb-shaped cross section so that the honeycomb cylindrical body 13 can efficiently ensure a surface area and an exhaust gas flow rate. The flat sheet 14 and the corrugated sheet 15 are formed using a sheet member made of stainless steel or other steel materials, and the flat sheet 14 and the corrugated sheet 15 are bonded to each other by brazing or the like.

Since the honeycomb carrier 11 is made of metal, the honeycomb carrier 11 has a relatively high strength compared to a carrier made of ceramic so that a thickness of each sheet member can be decreased. Accordingly, the diameter of the honeycomb carrier 11 can be decreased so that the honeycomb carrier 11 can be miniaturized while ensuring an exhaust gas flow speed. Accordingly, the honeycomb carrier 11 can be arranged in the exhaust pipe or the exhaust muffler of the motorcycle.

As shown in FIG. 1, assuming a length (length in the axial direction) of the honeycomb carrier 11 as a value L and a diameter of the honeycomb carrier 11 as a value D, the length L is set twice or more as large as the diameter D (L/D≥2).

By setting the length L twice or more as large as the diameter D, the honeycomb carrier 11 can ensure a sufficient surface area while setting the diameter thereof small such that the honeycomb carrier 11 can be arranged in the exhaust path of the motorcycle and, at the same time, the lowering of an exhaust gas flow speed can be also suppressed so that it is possible to prevent exhaust resistance from being adversely influenced by the honeycomb carrier 11.

Depending on the restriction imposed on an arrangement space for the honeycomb carrier 11 or the like, the honeycomb carrier 11 may have shapes other than the above-mentioned shape.

As shown in FIG. 2, a catalyst layer 21 is formed on a surface of the honeycomb carrier 11, and a heat-resistant protective layer 23 having heat resistance is formed on a surface of the catalyst layer 21.

The catalyst layer 21 is obtained in such a manner that the honeycomb carrier 11 is immersed into a solution (catalyst slurry) containing noble metal such as platinum (Pt), palladium (Pd) or rhodium (Rh), is cleaned (residual solution being removed), is sufficiently dried and, thereafter, is baked.

The catalyst layer 21 has the multi-layered structure formed of a first catalyst layer (lower layer) 21A formed on the surface of the honeycomb carrier 11 and a second catalyst layer (upper layer) 21B formed on a surface of the first catalyst layer 21A. When the catalyst layer 21 adopts the multi-layered structure, noble metals which constitute catalyst components can be allocated to the respective layers and hence, it is possible to acquire advantageous effects such as the prevention of alloying of noble metal whereby the lowering of the performance of the catalyst can be suppressed.

The first catalyst layer 21A contains carriers made of a cerium-zirconium (Ce—Zr) based composite oxide, and catalyst components made of palladium (Pd) or a Pd oxide which are carried on the carriers.

The first catalyst layer 21A can be obtained in the following manner. A first-layer-use slurry (wash-coating liquid) is prepared where carriers which carry catalyst components made of palladium (Pd) or a Pd oxide thereon and alumina ($Al_2O_3$) based components or the like are mixed into and dispersed into water. Then, the honeycomb carrier 11 is immersed into the first-layer-use slurry, is cleaned, is dried and, thereafter, is baked (first catalyst layer forming step).

In place of the first catalyst layer forming step described above, the first catalyst layer 21A may be formed in the following manner. A first-layer-use slurry (wash-coating liquid) which contains carriers before the carriers carry the catalyst components made of palladium (Pd) thereon is prepared. Then, the honeycomb carrier 11 is immersed into the first-layer-use slurry, is cleaned, is dried and, thereafter, is baked thus forming a lower coating layer (first-layer-use coating layer). Thereafter, the honeycomb carrier 11 is immersed into a solution which contains the above-mentioned catalyst components, is cleaned, is dried and, thereafter, is baked.

The second catalyst layer 21B contains carriers made of a zirconium (Zr) based composite oxide, catalyst components made of platinum (Pt) or a Pt oxide which are carried on the carriers, and catalyst components made of rhodium (Rh) or an Rh oxide which are carried on the carriers.

The second catalyst layer 21B can be obtained in the following manner. A second-layer-use slurry (wash-coating liquid) is prepared where carriers which carry catalyst components made of platinum (Pt) or a Pt oxide, or the catalyst component made of rhodium (Rh) or an Rh oxide thereon and alumina ($Al_2O_3$) based components or the like are mixed into and dispersed into water. Then, the honeycomb carrier 11 on which the first catalyst layer 21A is formed is immersed into the second-layer-use slurry, is cleaned, is dried and, thereafter, is baked (second catalyst layer forming step).

In place of the second catalyst layer forming step described above, the second catalyst layer 21B may be formed in the following manner. A second-layer-use slurry (wash-coating liquid) which contains the carriers before the carriers carry the catalyst components made of platinum (Pt) or a Pt oxide is prepared. Then, the honeycomb carrier 11 is immersed into the second-layer-use slurry, is cleaned, is dried and, thereafter, is baked thus forming an upper coating layer (second-layer-use coating layer). Thereafter, the honeycomb carrier 11 is immersed into a solution which contains the catalyst components, is cleaned, is dried and, thereafter, is baked.

Amounts of catalyst components in the first and second catalyst layers 21A, 21B are adjusted such that the first and second catalyst layers 21A, 21B can acquire sufficient cleaning performance. In this embodiment, a thickness to of the first catalyst layer 21A is set to a value which falls within a range from 50 to 70 μm, and a thickness tB of the second catalyst layer 21B is set to a value which falls within a range from 30 to 50 μm.

In the two-layered structure, palladium is contained in the first catalyst layer 21A which constitutes the lower layer, and Rh+Pt having a high reducing-gas removing activity and high durability is contained in the second catalyst layer 21B which constitutes the upper layer. Due to such a constitution, even in a state where an air-fuel ratio is rich or in a state where an air-fuel ratio changes, the diffusion of a reducing gas into the lower layer which contains palladium can be suppressed. Accordingly, durability of palladium contained in the lower layer can be enhanced.

The catalyst layer 21 is not limited to the two-layered structure, and may have the single-layered structure, or may have the structure having three or more layers.

The heat-resistant protective layer 23 has heat resistance against combustion heat or reaction heat of an unburned gas in an exhaust gas, and also has permeability which allows an exhaust gas to be supplied to the catalyst layer 21. The heat-resistant protective layer 23 is made of a heat-resistant metal compound or a powder mixture containing the heat-resistant metal compound. The heat-resistant protective layer 23 is a layer which does not contain noble metal such as platinum, palladium, rhodium.

To be more specific, the heat-resistant protective layer 23 is made of a heat-resistant metal oxide such as alumina, zirconia, an oxide of a cerium (Ce), an oxide of zirconium (Zr), an oxide of titanium (Ti), an oxide of silicon (Si), an oxide of magnesium (Mg), an oxide of yttrium (Y) or an oxide of lanthanum (La), or a mixture of these oxides. By making use of pores formed between particles of these materials, the heat-resistant protective layer 23 ensures permeability which allows an exhaust gas to be diffused into the catalyst layer 21. From a viewpoint of ensuring permeability, it is preferable that sizes of particle are made uniform so that pores are formed between the particles. However, provided that the above-mentioned permeability can be ensured, the sizes of particles are not necessarily made uniform.

Figure 3:
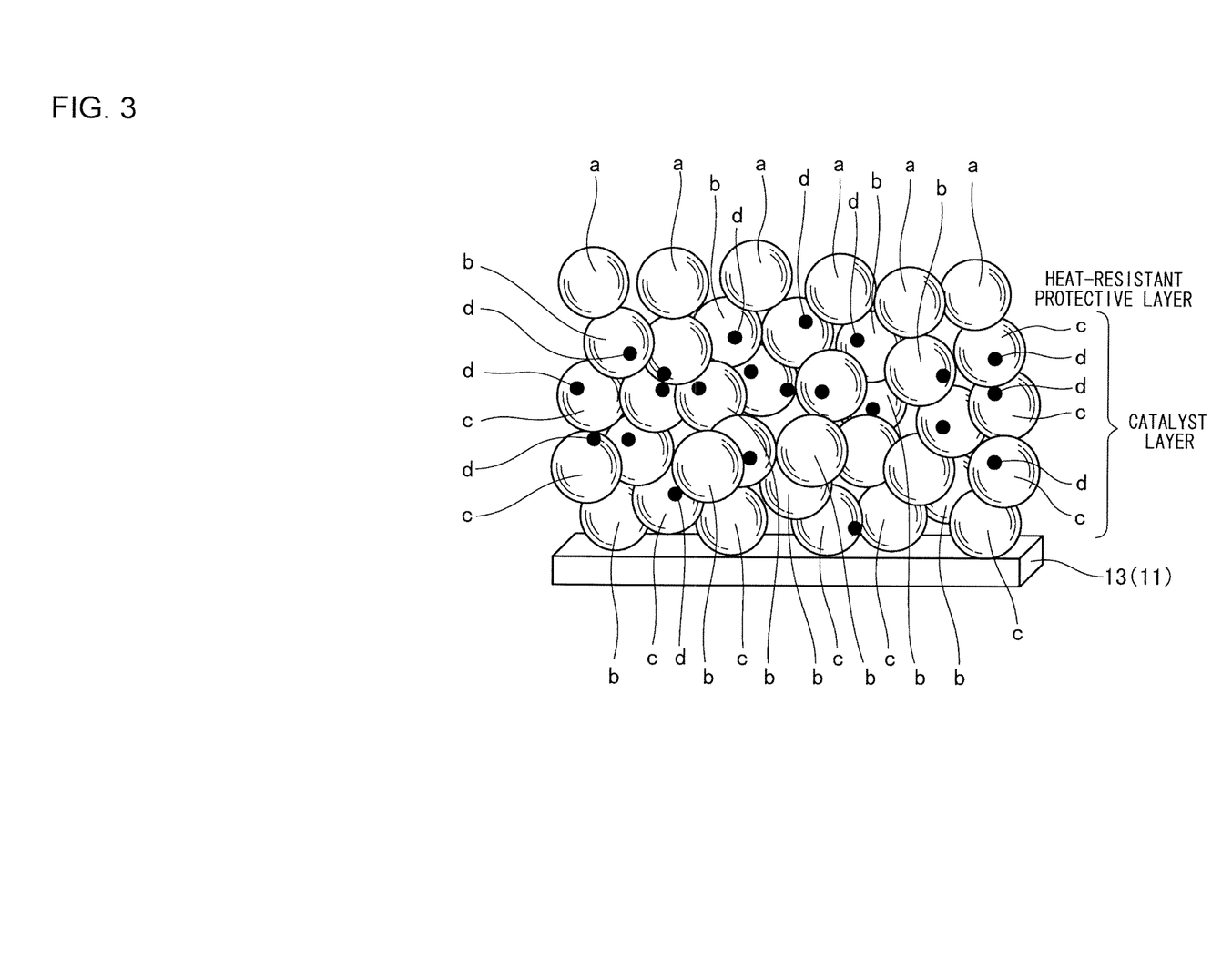
FIG. 3 is a view exemplifying a particle model of particles in a catalyst layer and a heat-resistant protective layer.

FIG. 3 exemplifies a particle model of particles in the catalyst layer 21 and in the heat-resistant protective layer 23. In FIG. 3, symbol "a" indicates particles which form the heat-resistant protective layer 23, symbol "b" indicates alumina in the catalyst layer 21, symbol "c" indicates carrier (promoters) in the catalyst layer 21, and symbol "d" indicates noble metal in the catalyst layer 21. In FIG. 3, although symbol "b" is given to all alumina, a large number of carriers and noble metals are contained in the catalyst layer 21 so that symbols "c", "d" are given to only some carriers and some noble metals. As exemplified in FIG. 3, pores are formed between the particles "a" which form the heat-resistant protective layer 23. It is apparent that permeability which allows an exhaust gas to be diffused into the catalyst layer 21 can be ensured by such pores.

From a viewpoint of ensuring a large surface area of the catalyst, it is preferable to use a material having a large specific surface area. For example, when alumina is used, it is considered to use α-alumina or intermediate alumina such as θ-alumina or γ-alumina. In this case, it is preferable to use θ-alumina or γ-alumina which has a relatively large specific surface area. However, when required heat resistance cannot be sufficiently acquired by θ-alumina or the like, it is preferable to use α-alumina. That is, it is sufficient that a material and a particle size are suitably selected corresponding to the required heat resistance and the required permeability. A factor for ensuring the permeability is not limited to a particle size, and other factors may be adopted. That is, it is sufficient that the permeability is ensured by performing setting including setting of at least a particle size of a material which forms the heat-resistant protective layer 23.

The heat-resistant protective layer 23 can be obtained in such a manner that a mixture is prepared where a heat-resistant material made of a heat-resistant metal compound or a powder mixture containing the heat-resistant metal compound are mixed into water, the mixture is applied to the honeycomb carrier 11 by coating, is dried and, thereafter, is baked. Provided that the prepared mixture can be applied to an outermost surface of the honeycomb carrier 11 by coating, the prepared mixture may take any one of a sol form, a slurry form and a colloidal form.

A thickness tC of the heat-resistant protective layer 23 is preferably set to 1 μm or more from a viewpoint of ensuring at least heat resistance, and is preferably set to 10 μm or less from a viewpoint of suppressing the increase of a material because of the heat-resistant protective layer 23 and from a viewpoint of the reduction of cost of the catalyst device. The thickness tC of the heat-resistant protective layer 23 is more preferably set to a value which falls within a range from 2 μm to 5 μm.

According to the result of the investigation which the inventors of the invention has made, in a conventional catalyst device which is not provided with the heat-resistant protective layer 23, a thickness of an abnormally deteriorated layer falls within a range of 2 μm to 5 μm. Accordingly, by setting the thickness of the heat-resistant protective layer 23 to a value which falls within a range from 2 μm to 5 μm, it is possible to suppress the thermal deterioration of the catalyst layer 21 while minimizing a thickness of the heat-resistant protective layer 23.

The thickness tC of the heat-resistant protective layer 23 can be adjusted by adjusting the concentration of the mixture or the like.

A motorcycle and a general-use four-wheeled vehicle were made to travel under the same traveling condition, and an air-fuel ratio of the motorcycle and an air-fuel ratio of the four-wheeled vehicle are obtained. The air-fuel ratios are shown in Table 1.

TABLE 1

| air-fuel ratio | motorcycle | general-use four-wheeled vehicle |
|---|---|---|
| less than 14.0 | 48% | 18% |
| 14.0 or more and less than 14.8 | 43% | 60% |
| 14.8 or more and less than 15.2 | 3% | 7% |
| more than 15.2 | 6% | 15% |

As shown in Table 1, when the motorcycle and the general-use four-wheeled vehicle are made to travel under the same traveling condition, an air-fuel ratio (A/F) of the motorcycle turns to a rich side compared to the general-use four-wheeled vehicle, and an average value of the air-fuel ratio of the motorcycle is 14.5 or less. This is one of the reasons that an amount of unburned gas in an exhaust gas is increased. Further, a valve overlap of the motorcycle is set large compared to the general-use four wheeled vehicle. This also becomes one of the reasons that an amount of unburned gas is increased.

From the above result, it is apparent that a temperature of an outermost surface of the catalyst device is liable to be elevated by being influenced by an unburned gas in an exhaust gas in the motorcycle compared to the general-use four-wheeled vehicle.

Next, an example of the invention is explained. In the explanation made hereinafter, a part by mass which indicates a relative amount of each component means an amount of each component excluding a dispersion medium and a solvent. The invention is not limited to the following example.

Example

As carriers of the first catalyst layer 21A, a $65CeO_2$-$25ZrO_2$-$8Nd_2O_3$-$2La_2O_3$ complex oxide B1 is prepared as follows. 65 parts by mass of cerium nitrate (in terms of $CeO_2$), 25 parts by mass of zirconium nitrate (in terms of $ZrO_2$), 8 parts by mass of neodymium nitrate (in terms of $Nd_2O_3$) and 2 parts by mass of lanthanum nitrate (in terms of $La_2O_3$) are put into a flask of 5 L, pure water of 2000 mL is added to these materials, and the mixture is stirred for 1 hour thus preparing a homogeneous solution. A 1N NH4OH solution is dropped into the solution until a pH of the solution becomes 7 while stirring the solution. A obtained deposit is filtered, is cleaned, is dried at 80° C. for 15 hours and, thereafter, is baked at 1000° C. for 3 hours thus preparing the $65CeO_2$-$25ZrO_2$-$8Nd_2O_3$-$2La_2O_3$ complex oxide B1.

60 parts by mass of the complex oxide B1 powder, 35 parts by mass of activated alumina powder, 5 parts by mass of alumina sol-based binder material (in terms of alumina) and 150 parts by mass of pure water are put in a ball mill, and the mixture is subjected to wet pulverization for 8 hours thus preparing a lower-layer-use slurry (wash-coating liquid).

As carriers of the second catalyst layer 21B, a $30CeO_2$-$60ZrO_2$-$8Nd_2O_3$-$2La_2O_3$ complex oxide B2 is prepared in the same manner as the preparation of the carriers of the first catalyst layer 21A except for that 30 parts by mass of cerium nitrate (in terms of $CeO_2$), 60 parts by mass of zirconium nitrate (in terms of $ZrO_2$), 8 parts by mass of neodymium nitrate (in terms of $Nd_2O_3$) and 2 parts by mass of lanthanum nitrate (in terms of $La_2O_3$) are used.

30 parts by mass of the complex oxide B2 powder, 65 parts by mass of activated alumina powder, 5 parts by mass of alumina sol-based binder material (in terms of alumina) and 200 parts by mass of pure water are put into a ball mill, and the mixture is subjected to wet pulverization for 8 hours thus preparing an upper-layer-use slurry (wash-coating liquid).

Next, two kinds of metal honeycomb carriers 11 made of stainless steel (a test piece having 300 cells, a core size of φ30×30 L and a core capacity of 25.6 cc, and a carrier for actual vehicle evaluation having a core size of φ40×90 L and a core capacity of 113 cc) are prepared respectively. Firstly, the lower-layer-use slurry is washcoated to the honeycomb carriers 11, is dried, and is baked at 500° C. for 1 hour thus forming a lower coating layer on the respective honeycomb carriers 11. An amount of wash-coating-slurry for forming the lower coating layer is 100 g per 1 L of a carrier base material.

Subsequently, the metal honeycomb carriers 11 on which the lower coating layer is already formed are immersed into a palladium nitrate aqueous solution of a predetermined concentration, are taken out from the aqueous solution, and are baked at 500° C. for 1 hour thus forming a first catalyst layer 21A on which palladium is carried on the respective metal honeycomb carriers 11.

Thereafter, the second-layer-use slurry is washcoated to the metal honeycomb carriers 11 on which the first catalyst layer 21A is formed, is dried, and is baked at 500° C. for 1 hour thus forming an upper coating layer. An amount of wash-coating-slurry for forming the upper coating layer is 50 g per 1 L of a carrier base material.

Then, the metal honeycomb carriers 11 on which the upper coating layer is formed are immersed into a mixed solution formed of a nitric acid solution of rhodium nitrate and a nitric acid solution of platinum and having a predetermined concentration. The metal honeycomb carriers 11 are taken out from the mixed solution and, thereafter, are baked at 500° C. for 1 hour thus preparing catalyst devices 10 each having the two-layered-structure where palladium is carried on the lower layer (first catalyst layer 21A), and platinum and rhodium are carried on the upper layer (second catalyst layer 21B). An amount of palladium carried on the lower layer of the catalyst device 10 is 1.50 g per 1 L of the carrier base material in terms of Pd, an amount of platinum carried on the upper layer is 0.75 g per 1 L of the carrier base material in terms of Pt, and an amount of rhodium carried on the upper layer is 0.15 g per 1 L of the carrier base material in terms of Rh.

Next, hydrated alumina is mixed with a predetermined amount of deionized water, the mixture is milled thus preparing an alumina sol, and the alumina sol is applied to the catalyst devices 10 by coating. Thereafter, the alumina sol is dried at 120° C., is baked at 400° C. for 2 hours thus forming a coating layer which constitutes a heat-resistant protective layer 23. In this case, a coating amount of the alumina sol is 10 g per 1 L of the carrier base material.

<Test>

Next, the catalyst device 10 of the above-mentioned example is assembled into a muffler of a motorcycle in a state where secondary air is cut, and the correlation between an endurance distance (traveling distance) and a cleaning rate is measured.

As a comparison example, the same measurement is performed with respect to a catalyst device which includes a catalyst layer 21 substantially equal to the catalyst layer 21 of the example except for that the catalyst layer 21a of the comparison example is not provided with the coating layer of the example.

A vehicle which is used for the measurement is a single cylinder motorcycle having the displacement of 125 cc, and lead-free gasoline is used as a fuel.

Figure 4:
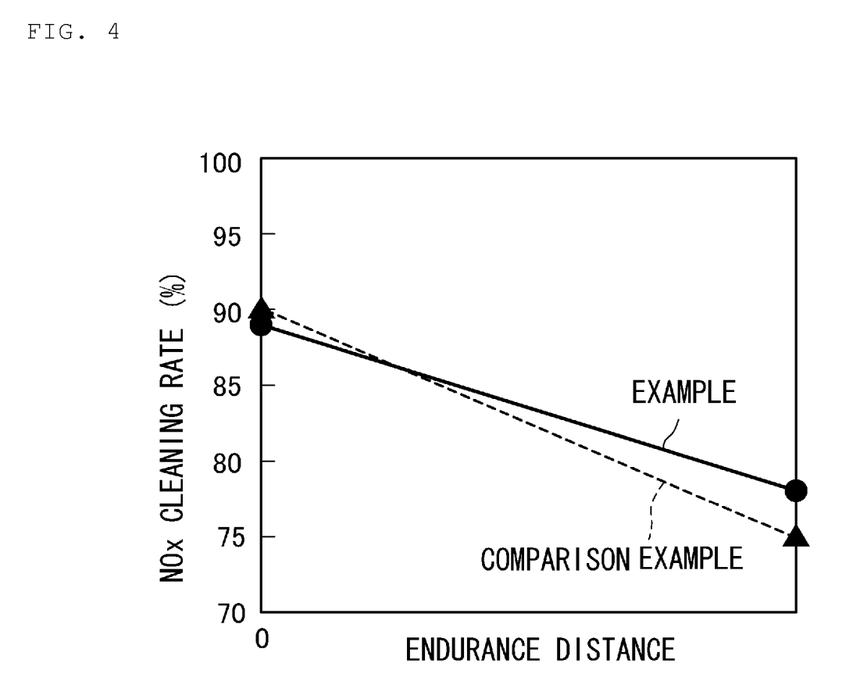
FIG. 4 is a graph showing a result of measurement of an NOx cleaning rate.

The result of the measurement of an NOx cleaning rate in this case is shown in FIG. 4.

As shown in FIG. 4, the result is obtained that, compared to the comparison example which does not include the heat-resistant protective layer 23, the example which includes the heat-resistant protective layer 23 exhibits less deterioration in the cleaning performance. From this result, it is apparent that the thermal deterioration of the catalyst caused by an exhaust gas can be suppressed by the heat-resistant protective layer 23. Accordingly, the durability of the catalyst can be enhanced.

Since the durability of the catalyst can be enhanced, an amount of catalyst material which is necessary for satisfying the required durability can be decreased. Accordingly, a use amount of noble metal in the catalyst can be reduced and, particularly, a use amount of noble metal in the catalyst which is used for forming the upper layer (second catalyst layer 21B) can be reduced and hence, the catalyst device can have a reduced manufacturing cost.

As has been explained above, according to embodiments of the invention, the heat-resistant protective layer 23 having higher heat resistance than the catalyst layer 21 and permeability which allows an exhaust gas to be supplied to the catalyst layer 21 is formed on the surface of the catalyst layer 21 and hence, the thermal deterioration of the outermost surface of the catalyst device 10 can be suppressed. As a result, the durability of the catalyst device 10 is enhanced, and a use amount of noble metal in the catalyst can be reduced correspondingly.

Accordingly, even when the catalyst device 10 is mounted on a motorcycle where an internal combustion engine is capable of being used in a region where an average value of an air-fuel ratio in the internal combustion engine is 14.5 or less, the thermal deterioration of the outermost surface of the catalyst device 10 can be suppressed so that the durability of the catalyst device 10 can be enhanced and an amount of noble metal in the catalyst can be reduced.

Since the catalyst layer 21 contains noble metal, and the heat-resistant protective layer 23 does not contain noble metal, the thermal deterioration of noble metal which is used for the catalyst can be suppressed so that the catalyst device 10 can be obtained at a low cost by efficiently reducing a use amount of noble metal.

The heat-resistant protective layer 23 is formed using a heat-resistant metal compound such as alumina or zirconia or a powder mixture containing such a heat-resistant metal compound and hence, the heat-resistant protective layer 23 can be formed using a relatively inexpensive material, and the heat-resistant protective layer 23 can acquire an improved close contact property with a surface of the catalyst.

The permeability of the heat-resistant protective layer 23 is ensured by performing setting including setting of at least a particle size of a material which forms the heat-resistant protective layer 23 and hence, the heat-resistant protective layer 23 can easily ensure permeability without requiring the particular structure for ensuring permeability which allows an exhaust gas to be diffused into the catalyst layer 21.

In the above-mentioned configuration, the thickness of the heat-resistant protective layer 23 is set to 1 μm to 10 μm and hence, the deterioration of the catalyst layer 21 can be suppressed while preventing a thickness of the heat-resistant protective layer 23 from becoming excessively large.

The honeycomb carrier 11 is a metal carrier where the honeycomb cylindrical body 13 which is formed in a plurality of layers by winding the metal flat sheet 14 and the metal corrugated sheet 15 in an overlapping manner is supported on the cylindrical casing 12 which constitutes a metal outer sleeve, and a length L of the honeycomb carrier 11 is set twice or more as large as a diameter D of the honeycomb carrier. Due to such a constitution, the deterioration of the catalyst caused by a high thermal load on an upstream side can be suppressed and hence, the honeycomb carrier 11 can ensure a surface area and a strength thereof whereby the honeycomb carrier 11 can easily decrease a diameter thereof and also can be easily miniaturized. Accordingly, the catalyst device can be easily arranged in a motorcycle having an exhaust path of a small space compared to a four-wheeled vehicle.

The above-mentioned embodiment merely constitutes one mode of the invention, and modifications and applications are conceivable when desired without departing from the gist of the invention. For example, in the embodiment, the explanation has been made with respect to the case where the invention is applied to the catalyst device 10 for a motorcycle. However, the invention is also applicable to a catalyst device which is used in a saddle-ride-type vehicle or a four-wheeled vehicle. Particularly, the catalyst device of the invention is preferably applicable to a catalyst device for an internal combustion engine where an unburned gas is liable to be contained in an exhaust gas.

The saddle-ride-type vehicle includes vehicles of a type in general where a rider rides on a vehicle body in a straddling manner. Accordingly, the saddle-ride-type vehicle is not limited to a motorcycle (including a bicycle with a prime mover), and also includes a three-wheeled vehicle and a four-wheeled vehicle which are classified into an ATV (all-terrain vehicle) or the like.

DESCRIPTION OF REFERENCE NUMERALS AND SIGNS

10: catalyst device
11: honeycomb carrier
12: cylindrical casing (metal outer sleeve)
13: honeycomb cylindrical body
14: flat sheet (metal flat sheet)
15: corrugated sheet (metal corrugated sheet)
21: catalyst layer
21A: first catalyst layer (lower layer)
21B: second catalyst layer (upper layer)
23: heat-resistant protective layer

The invention claimed is:

1. A catalyst for exhaust gas, said catalyst comprising:
a honeycomb carrier;
a catalyst layer disposed on the honeycomb carrier; and
a heat-resistant protective layer having heat resistance and permeability which is configured to allow an exhaust gas to be supplied to the catalyst layer,
wherein said heat-resistant protective layer is formed on a surface of the catalyst layer, and
wherein the heat-resistant protective layer has a thickness of 1 μm to 10 μm.

2. The catalyst according to claim 1, wherein the catalyst layer contains noble metal, and wherein the heat-resistant protective layer does not contain noble metal.

3. The catalyst according to claim 1, wherein the heat-resistant protective layer comprises a heat-resistant metal compound or a powder mixture of the heat-resistant metal compound.

4. The catalyst according to claim 3, wherein permeability of the heat-resistant protective layer is ensured by performing setting including setting of at least a particle size of a material which forms the heat-resistant protective layer.

5. The catalyst according to claim 1, wherein
the honeycomb carrier comprises a metal carrier including a cylindrical body which is formed in a plurality of layers by a wound metal flat sheet and a metal corrugated sheet wound in an overlapping manner, and is supported on a metal outer sleeve, and
wherein a length L of the honeycomb carrier is set twice or more as large as a diameter D of the honeycomb carrier.

6. A catalyst for exhaust gas, said catalyst comprising:
a honeycomb carrier;
a catalyst layer disposed on the honeycomb carrier; and
a heat-resistant protective layer having heat resistance and permeability which is configured to allow an exhaust gas to be supplied to the catalyst layer,
wherein said heat-resistant protective layer is formed on a surface of the catalyst layer,
wherein the heat-resistant protective layer comprises a heat-resistant metal compound or a powder mixture of the heat-resistant metal compound,
wherein permeability of the heat-resistant protective layer is ensured by performing setting including setting of at least a particle size of a material which forms the heat-resistant protective layer, and
wherein the heat-resistant protective layer contains at least one of alumina and zirconia.

\* \* \* \* \*